UNITED STATES PATENT OFFICE.

EDUARD HEPP, OF BIEBRICH-ON-THE-RHINE, GERMANY, ASSIGNOR TO THE FIRM OF KALLE & CO., OF SAME PLACE.

DISULPHO-ACID OF PHENYL-ROSINDULINE.

SPECIFICATION forming part of Letters Patent No. 466,852, dated January 12, 1892.

Application filed August 6, 1891. Serial No. 401,932. (Specimens.)

*To all whom it may concern:*

Be it known that I, EDUARD HEPP, a subject of the Emperor of Germany, residing at Biebrich-on-the-Rhine, Germany, have invented new and useful Improvements in Coloring-Matter, of which the following is a specification.

My invention has for its object the production of a new disulpho-acid of the red basic coloring-matter of the formula

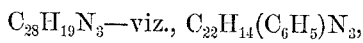

which, in the publications I made in collaboration with Otto Fischer, I first termed "rosinduline" (*Berichte der Deutsch. Chem. Ges.*, 21., 2621,) and then "phenyl-rosinduline," (*Ann. d. Chem.*, 256, 235,) this new denomination having been found necessary after the discovery of a less complicated body ($C_{22}H_{15}N_3$) belonging to the same class of products.

Although the phenyl-rosinduline may be obtained by many methods, there are only two which have hitherto given a good result in practice. The one method consists in the action of aniline upon the chlorhydrate of benzine-azo-alpha-naphthylamine, (German Patent No. 45,370, of the Badische Anilin and Soda Fabrik, O. Fischer and E. Hepp, *Berichte der Deutsch. Chem. Ges.*, 21. 680; *Ann. d. Chem.*, 256, 241.) The other process consists in treating the chlorhydrate of nitroso-dimethyl-alpha-naphthylamine with aniline (German Patent No. 50,822, of Kalle & Co., O. Fischer, and E. Hepp, *Ann. d. Chem.*, 256, 241.) If the so-called "melts" be well made, the product thus obtained does not need any further purification by means of crystallization or by the separation of a monosulpho-acid.

To carry out my invention—that is to say, to convert the phenyl-rosinduline into the above-named new disulpho-acid, which may be termed "beta-disulpho-acid"—I proceed as follows: I dissolve one (1) part of phenyl-rosinduline in fifteen parts of concentrated sulphuric acid, and I heat this solution for about twelve hours to 170° centigrade, until a sample precipitated by means of water and filtered off is easily soluble in cold pure water. I then dilute the product with about the double quantity of water and precipitate the sodium salt of the disulpho-acid by adding a concentrated solution of common salt. The dye-stuff thus separated is filtered, pressed, and dried. It dyes wool in an acidulated bath red-bluish shades.

To prepare the free beta-disulpho-acid in a pure condition, after the mixture of phenyl-rosinduline and of concentrated sulphuric acid is heated for a sufficiently long time and poured into water, I filter the precipitate thus obtained, I dissolve it in alcohol, and I evaporate the alcoholic solution to crystallization. The free beta-disulpho-acid is very easily soluble in cold pure water, but scarcely soluble in diluted sulphuric (1:1) or hydrochloric (1:2) acid. The product, crystallized from alcohol and dried for six hours at 120° centigrade, was proved by the analysis to be a disulpho-acid of the formula

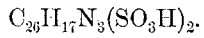

The potassium and sodium salts are also very easily soluble in water. They are precipitated from their aqueous solution by means of common salt, the precipitation being more complete when a caustic-alkali lye is added, whereas the salts of the phenyl-rosinduline disulpho-acid, (described in the Letters Patent No. 430,975,) when heated with water under pressure, give the rosindone $C_{22}H_{14}N_2O$, (O. Fischer and E. Hepp, *Ann. d. Chem.*, 256, 239 and 262, 243.) The salts of the beta-disulpho-acid give by the same treatment a mono-sulpho-acid of the said rosindone, and of the formula

Like the phenyl-rosinduline and its already-known sulpho-acids, the beta-phenyl-rosinduline disulpho-acid gives with concentrated sulphuric acid a bright-green solution.

What I claim as new, and desire to secure by Letters Patent, is—

The hereinbefore-described beta-disulpho-acid of the red basic coloring-matter termed "phenyl-rosinduline," which disulpho-acid is represented by the formula $C_{28}H_{17}N_3(SO_3N_2)$ and has the following properties: It is a red crystalline powder, giving with concentrated sulphuric acid a strong green solution; it is very easily soluble in cold water, but scarcely soluble in diluted sulphuric (1:1) or hydrochloric (1:2) acid; its potassium and sodium salts are very soluble in cold water and are precipitated from the aqueous solution by means of common salt, the precipitation being more complete when caustic-alkali lye is added; they dye wool red-bluish shades.

In testimony whereof I have signed my name to this specification in the presence of two subscribing witnesses.

EDUARD HEPP.

Witnesses:
ALVESTO S. HOGUE,
JEAN GRUND.